(12) United States Patent
Norelius

(10) Patent No.: US 8,826,810 B1
(45) Date of Patent: Sep. 9, 2014

(54) PORTABLE MILK PASTEURIZER/HOMOGENIZER AND ASSOCIATED METHOD

(76) Inventor: Blake Norelius, Woodland Hills, CA (US)

( * ) Notice: Subject to any disclaimer, the term of this patent is extended or adjusted under 35 U.S.C. 154(b) by 293 days.

(21) Appl. No.: 12/940,822

(22) Filed: Nov. 5, 2010

Related U.S. Application Data

(60) Provisional application No. 61/258,673, filed on Nov. 6, 2009.

(51) Int. Cl.
  *A23C 3/02* (2006.01)
  *A01J 11/00* (2006.01)
  *A23C 3/03* (2006.01)
  *A23L 3/005* (2006.01)

(52) U.S. Cl.
  CPC ............ *A01J 11/00* (2013.01); *A23C 3/031* (2013.01); *A23L 3/005* (2013.01)
  USPC .................. 99/453; 99/452; 99/455

(58) Field of Classification Search
  CPC .......... A23L 3/22; A01J 27/04; A23C 3/3075
  USPC ........... 99/451–455, 467, 470, 483, 287, 645; 122/4 R; 134/60.85, 90, 105
  See application file for complete search history.

(56) References Cited

U.S. PATENT DOCUMENTS

| | | | |
|---|---|---|---|
| 1,909,872 A | 5/1933 | Lesperance | |
| 2,436,585 A | 2/1948 | Mangold | |
| 2,510,796 A * | 6/1950 | Brown | 99/451 |
| 2,769,564 A | 11/1956 | Hoggren | |
| 4,479,423 A * | 10/1984 | Schwitters et al. | 99/455 |
| 6,189,440 B1 * | 2/2001 | Amundson | 99/455 |
| 6,276,264 B1 | 8/2001 | Dumm | |
| 2004/0140304 A1 * | 7/2004 | Leyendecker | 219/386 |
| 2005/0103213 A1 * | 5/2005 | Dumm | 99/483 |

* cited by examiner

*Primary Examiner* — Thien S Tran

(57) ABSTRACT

A portable milk pasteurizing and homogenizing device may include a portable frame. Such a portable frame may include a heating section and a pump section adapted to heat and receive unpasteurized and unhomogenized milk. A controller may be operably coupled to the heating section and the pump section respectively. A portable cooling section may further be positioned adjacent to the frame and may be in fluid communication with the pump section. A portable collection reservoir may be positioned adjacent to the frame and may further be in fluid communication with the cooling section to receive the pasteurized and homogenized milk from the cooling section. The cooling section and the collection reservoir may further be spaced from the frame and be independently transported while the heating section and the pump section remain stationary respectively.

16 Claims, 5 Drawing Sheets

PORTABLE MILK PASTEURIZER/HOMOGENIZER AND ASSOCIATED METHOD

CROSS REFERENCE TO RELATED APPLICATIONS

This application claims the benefit of U.S. Provisional Application No. 61/258,673, filed Nov. 6, 2009, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to milk storage and, more particularly, to a portable breast milk pasteurizer/homogenizer for providing users with an effective means of extending the shelf life of breast milk.

2. Prior Art

Millions of women nurse their babies. A natural means of transferring nutrients, nursing is beneficial to both the child and the mother. Encouraged by most pediatricians, medical associations and the United States Surgeon General, Dr. David Satcher, nursing during the first several months of life can result in a healthy, happy child. Nursing is so important that a recent article published by the American Dietetic Association (ADA) strongly advocates and promotes this natural means of feeding one's child for its "indisputable nutritional, immunological, psychological and economic benefits." Some of the many benefits of nursing that have been documented include; fewer ear and respiratory infections, potentially fewer allergies, reduced incidence of blood infections, meningitis, cancer, insulin-dependent diabetes and most importantly, lower mortality rate and occurrences of Sudden Infant Death Syndrome (SIDS).

Additionally, breast milk transfers disease-preventing immunities from the mother to the child and is a recognized "brain food." For the nursing mother, benefits are also plentiful. In addition to creating a lasting bond between mother and child, women who nurse have lower occurrences of breast and ovarian cancer. Nursing triggers the uterine muscles, forcing them to constrict and returning the uterus to the pre-pregnancy size ad shape. Passing calories, fat and nutrients to their babies through breast milk, mothers that nurse also lose weight faster than those who do not. Furthermore, nursing one's child also saves potentially thousands of dollars in costly infant formulas and caned milk products.

For working mothers, breast feeding may be a sensitive issue in public or places of work. These locations may be inconvenient or unhygienic such as public areas where there are traffic or work places where machineries and dirty equipment are placed. Additionally, working mothers may need to store their breast milk due to extra capacity or waiting feeding time. Such inconveniences may cause busy moms to abandon breast feeding prematurely.

Accordingly, a need remains for a device in order to overcome the above-noted shortcomings. The present invention satisfies such a need by providing a portable milk pasteurizer/homogenizer that is convenient and easy to use, lightweight yet durable in design, versatile in its applications, and designed for providing users with a convenient means of lengthening the shelf life of breast milk.

BRIEF SUMMARY OF THE INVENTION

In view of the foregoing background, it is therefore an object of the present invention to provide an apparatus for pasteurizing and homogenizing milk. These and other objects, features, and advantages of the invention are provided by a portable milk pasteurizing and homogenizing device.

The portable milk pasteurizing and homogenizing device may include a portable frame. Such a portable frame may include a heating section and a pump section adapted to heat and receive unpasteurized and unhomogenized milk. A controller may be operably coupled to the heating section and the pump section respectively. A portable cooling section may further be positioned adjacent to the frame and may be in fluid communication with the pump section. A portable collection reservoir may be positioned adjacent to the frame and may further be in fluid communication with the cooling section to receive the pasteurized and homogenized milk from the cooling section.

The cooling section and the collection reservoir may further be spaced from the frame and be independently transported while the heating section and the pump section remain stationary respectively. Such an arrangement provides the unexpected and unpredictable advantage of pasteurizing and homogenizing fresh milk in a hygienic manner without having to heat and cool the milk using two different sets of devices respectively. The invention thus advantageously provide users with a convenient means of lengthening the shelf life of breast milk for example, for later use in public locations where it is inconvenient to breastfeed a baby.

The device may further include a funnel preferably having a first passageway communicatively coupled to the pump section and adapted to transfer the pasteurized milk along the first passageway into the pump section. The heating section may include a heating element located at the frame and a heating vessel removably positioned on the heating element. The heating vessel may be adapted to receive the unpasteurized and unhomogenized breast milk therein. Such an arrangement provides the unexpected and unpredictable advantage of locating the heating section of the device close to the pump section whereby the milk after being pasteurized may be easily poured into the pump section via the funnel and further transferred to the cooling section for homogenizing without overly exposing of the warm milk to the external environment.

The controller may include a first user interface communicatively coupled to the pump section. Such a first user interface may be toggled between on and off modes for operating the pump section. A second user interface may be communicatively coupled to the heating section. Such a second user interface may control at least one of a temperature level and timing cycle of the heating section. Such an arrangement provides the unexpected and unpredictable advantage of allowing the pump section and the heating section to be independently and/or simultaneously operated. As a non-limiting example, a user may place the heating vessel to pasteurize the fresh milk at the heating section while at the same time, another heating vessel of pasteurized milk may be poured into the funnel of the pump section to transfer to the cooling section for homogenizing another batch of milk simultaneously.

The pump section may include a second passageway in fluid communication with the first passageway and oriented at a right angle thereto. Such a second passageway may be disposed above and exterior of the cooling section.

The cooling section may include a cooling vessel adapted to receive a cooling agent therein and a tube directly connected to a dispensing end of the pump section. The tube may extend downwardly from the pump section and passing through the cooling vessel wherein the tube is adapted to be exposed to the cooling agent. The tube may further include a discharge end situated exterior of the cooling vessel. In this way, the pasteurized and unhomogenized milk is cooled while traveling through the tube. The tube may further include a third passageway in fluid communication with the second passageway. Such a third passageway may pass through the cooling vessel and terminate at the collection reservoir. The third passageway may further include a helical section completely situated within the cooling vessel. Such an arrangement provides the unexpected and unpredictable advantage of homogenizing the pasteurized milk in a continuous flow process from the funnel to the collection reservoir without having to handle the milk by a user. Such an automated homogenizing process advantageously avoids cross-contamination of the milk during the cooling process.

The invention may include a method of utilizing a portable milk pasteurizing and homogenizing device. Such a method may include the chronological steps of: providing a portable frame, the portable frame including a heating section, a pump section and a controller operably coupled to the heating section and the pump section respectively; providing and positioning a portable cooling section adjacent to the portable frame such that the portable cooling section is in fluid communication with the pump section; providing and positioning a portable collection reservoir adjacent to the frame such that the portable collection reservoir is in fluid communication with the portable cooling section, wherein the portable cooling section and the portable collection reservoir are spaced from the frame and independently transported while the heating section and the pump section remain stationary;

The method may further include the steps of: obtaining and pouring unpasteurized and unhomogenized milk within the heating section; the heating section pasteurizing the unpasteurized and unhomogenized milk; pouring the pasteurized and unhomogenized milk to the pump section; the pump section transferring the pasteurized and unhomogenized milk to the portable cooling section; and the reservoir receiving pasteurized and homogenized milk from the portable cooling section.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
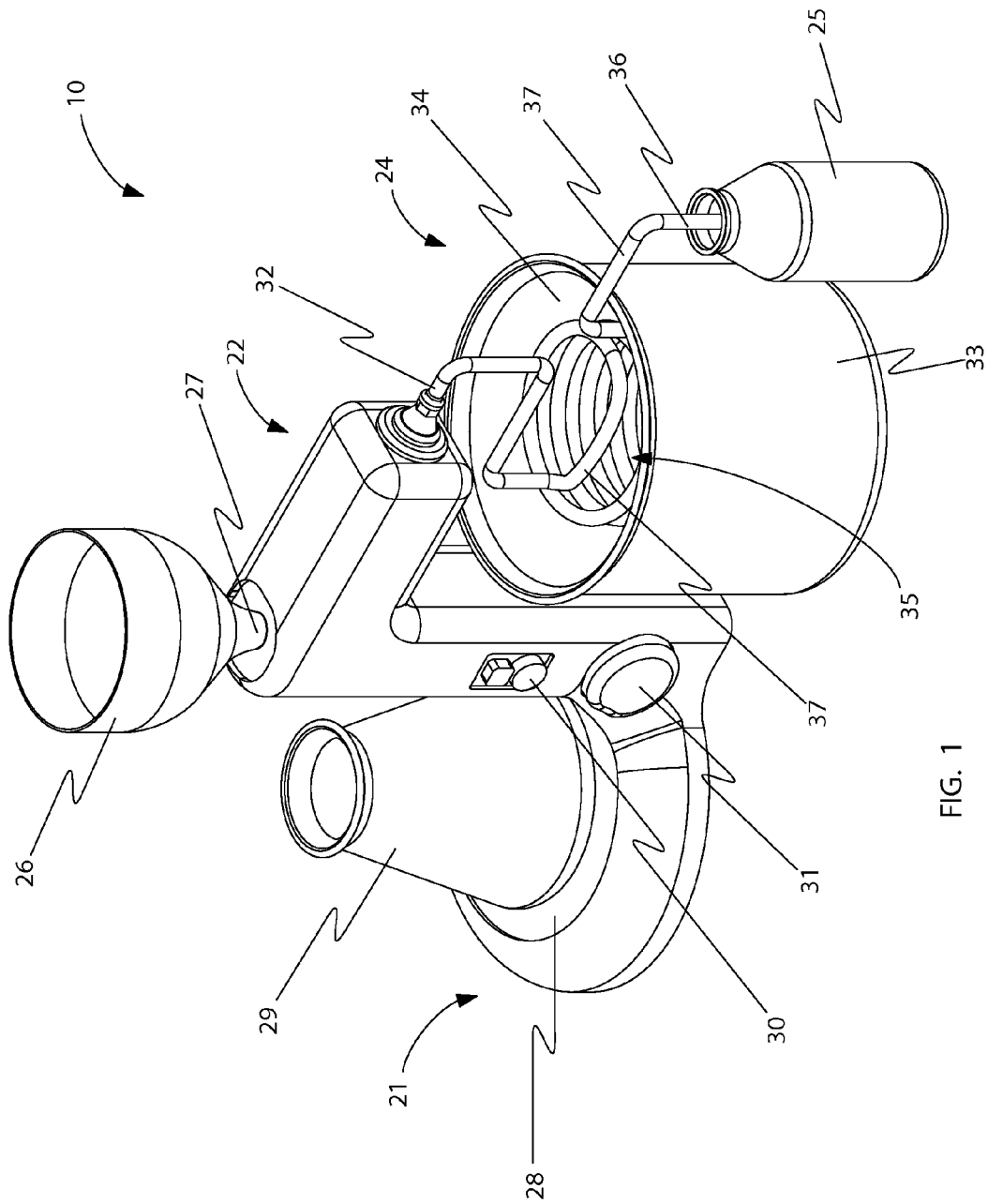
FIG. 1 is a perspective view showing a portable milk pasteurizing and homogenizing device, in accordance with an exemplary embodiment of the present invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

Referring generally to FIGS. 1-5, the portable milk pasteurizing and homogenizing device 10 may include a portable frame 20. Such a portable frame 20 may include a heating section 21 and a pump section 22. Such heating and pump sections 21, 22 are respectively adapted to heat as well as receive unpasteurized and unhomogenized milk. A controller 23 may be operably coupled to the heating section 21 and the pump section 22, respectively. A portable cooling section 24 may be positioned adjacent to the frame 20 and may be in fluid communication with the pump section 22. A portable collection reservoir 25 may be positioned adjacent to the frame 20 and may be in fluid communication with the cooling section 24 to receive the pasteurized and homogenized milk from the cooling section 24. This structural arrangement enables a user to pasteurize breast milk and thereafter homogenize the breast milk without requiring conventional appliances such as a stove and refrigerator for example.

The cooling section 24 and the collection reservoir 25 may further be spaced from the frame 20 and be independently transported while the heating section 21 and the pump section 22 remain stationary respectively. Such an arrangement provides the unexpected and unpredictable advantage of pasteurizing and homogenizing milk in a hygienic manner without having to heat and cool the milk using two different sets of devices respectively (such as a stove and refrigerator, which are not readily available outdoors). The invention advantageously provide users with a convenient way of lengthening the shelf life of breast milk for later use in public locations where it is inconvenient to breastfeed a baby.

Figure 2:
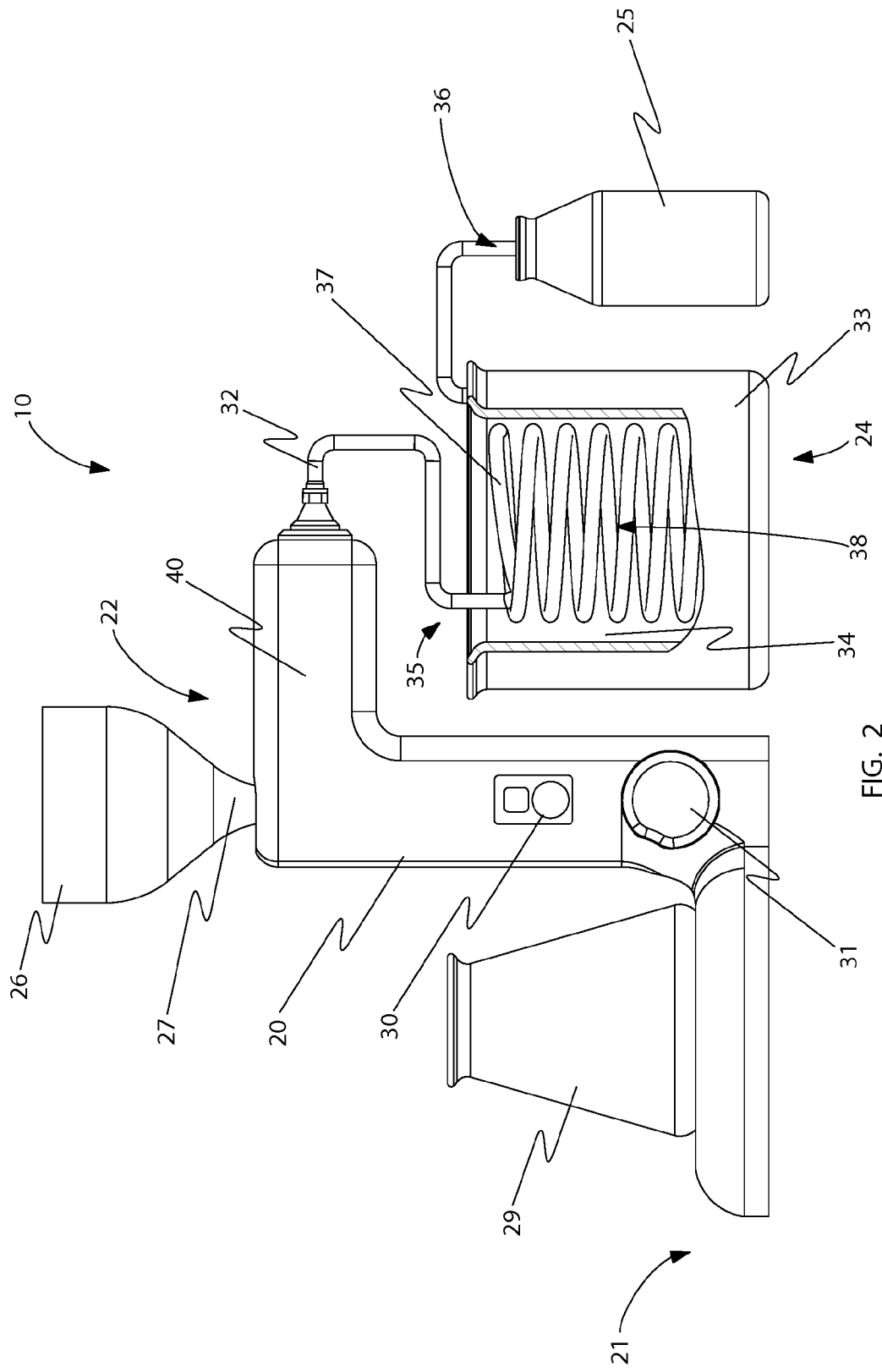
FIG. 2 is a side elevational view of the exemplary embodiment shown in FIG. 1

Referring to FIGS. 1 and 2, the device 10 may further include a funnel 26 preferably having a first passageway 27 communicatively coupled to the pump section 22 and adapted to transfer the pasteurized milk along the first passageway 27 into the pump section 22. The heating section 21 may include a heating element 28 located at the frame and a heating vessel 29 removably positioned on the heating element 28. The heating vessel 29 may be adapted to receive the unpasteurized and unhomogenized breast milk therein. Such a structural arrangement provides the unexpected and unpredictable advantage of locating the heating section 21 close to the pump section 22 whereby the pasteurized milk may be easily poured into the pump section 22 via the funnel 26 and further transferred to the cooling section 24 for homogenizing without unduly exposing the pasteurized milk to ambient environmental conditions.

Figure 3:
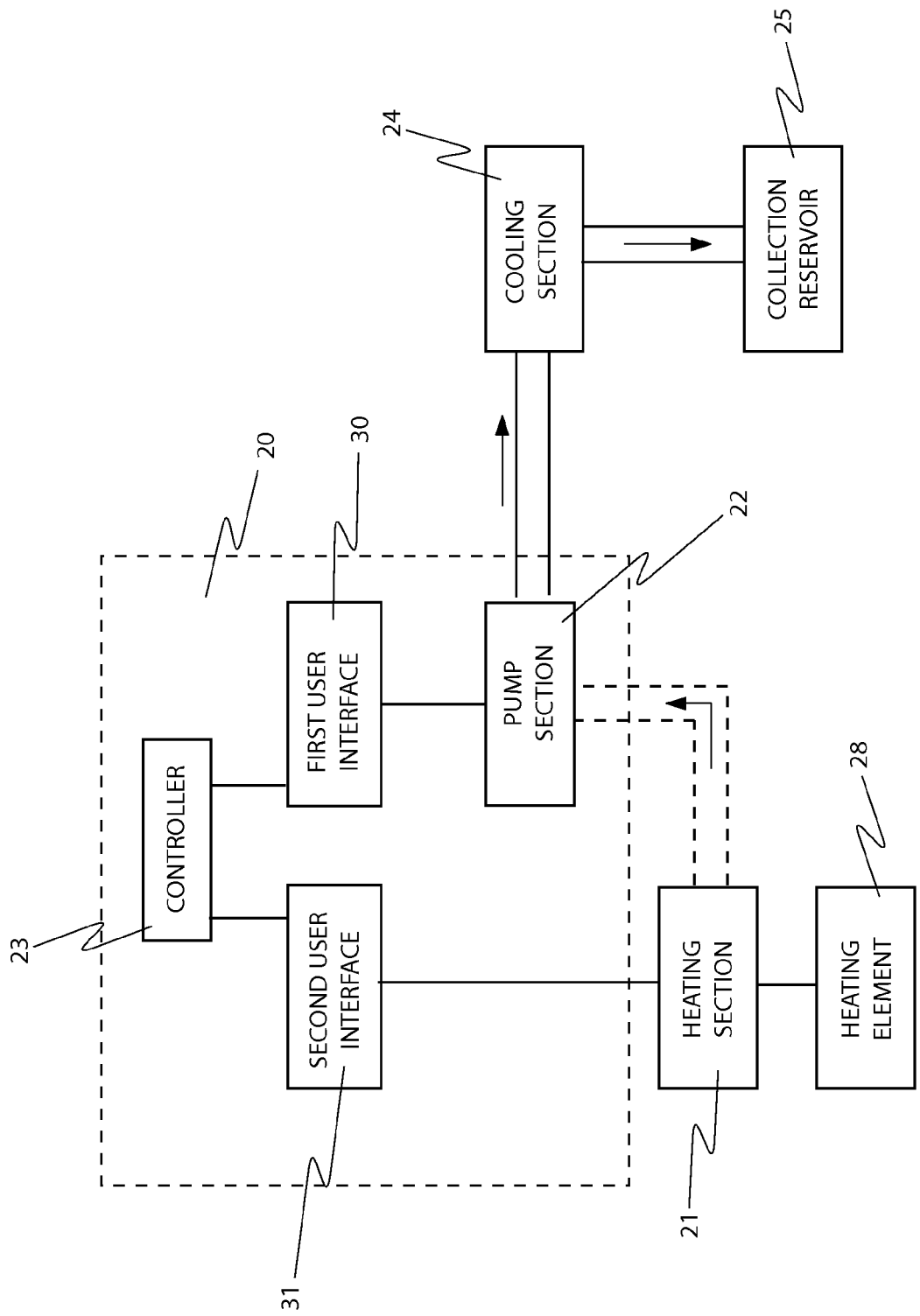
FIG. 3 is a schematic block diagram of the device.

Referring to FIG. 3, the controller 23 may include a first user interface 30 (such as a toggle switch) communicatively coupled to the pump section 22. Such a first user interface 30 may be toggled between on and off modes for operating the pump section 22 in a manner well understood by one skilled in the art. A second user interface 31 (such as a rheostat dial) may be communicatively coupled to the heating section 21. Such a second user interface 31 may control at least one of a temperature level and timing cycle of the heating section 21 in a manner well understood by one skilled in the art. For example, the second user interface 31 may have predefined setting that automatically heat the heating element 28 to a predefined temperate level for a predefined time period, as may be found with conventional toasters, for example. Such an arrangement provides the unexpected and unpredictable advantage of allowing the pump section 22 and the heating section 21 to be independently and/or simultaneously operated as needed by the user. As a non-limiting example, the heating section 21 may pasteurize one batch of breast milk while the cooling and pumping sections 24, 22 cooperate to contemporaneously homogenize another batch of previously pasteurized milk.

Referring back to FIGS. 1 and 2, the pump section 22 may include a second passageway 32 in fluid communication with the first passageway 27 and oriented at a right angle thereto. Such a second passageway 32 may be disposed above and exterior of the cooling section 24. Such a structural configuration ensures the pasteurized milk is adequately stirred during the homogenizing process to prevent undesirable settling.

Referring to FIGS. 1 and 2, the cooling section 24 may include a cooling vessel 33 adapted to receive a cooling agent 34 (such as ice water) therein and a tube 35 directly connected to a dispensing end of the pump section 22. The tube 35 may extend downwardly from the pump section 22 and pass through the cooling vessel 33 wherein the tube 35 is adapted to be exposed to the cooling agent 34. The tube 35 may further include a discharge end 36 situated exterior of the cooling vessel 33. In this way, the pasteurized and unhomogenized milk is cooled while traveling through the tube 35. Such a structural configuration ensures the pasteurized milk is adequately exposed to the cooling agent 34 prior to exiting the tube 35.

As shown in FIGS. 1 and 2, the tube 35 defines a third passageway 37 in fluid communication with the second passageway 32. Such a third passageway 37 may pass through the cooling vessel 33 and terminate at the collection reservoir 25. The third passageway 37 may further include a helical section 38 completely situated within the cooling vessel 33. Such a structural arrangement provides the unexpected and unpredictable advantage of homogenizing the pasteurized milk in a continuous travel path from the funnel 26 to the collection reservoir 25 without prematurely exposing the milk to ambient environmental conditions. Such a continuous travel path ensures the milk is not contaminated nor permitted to prematurely settle during the homogenizing process.

Figure 4:
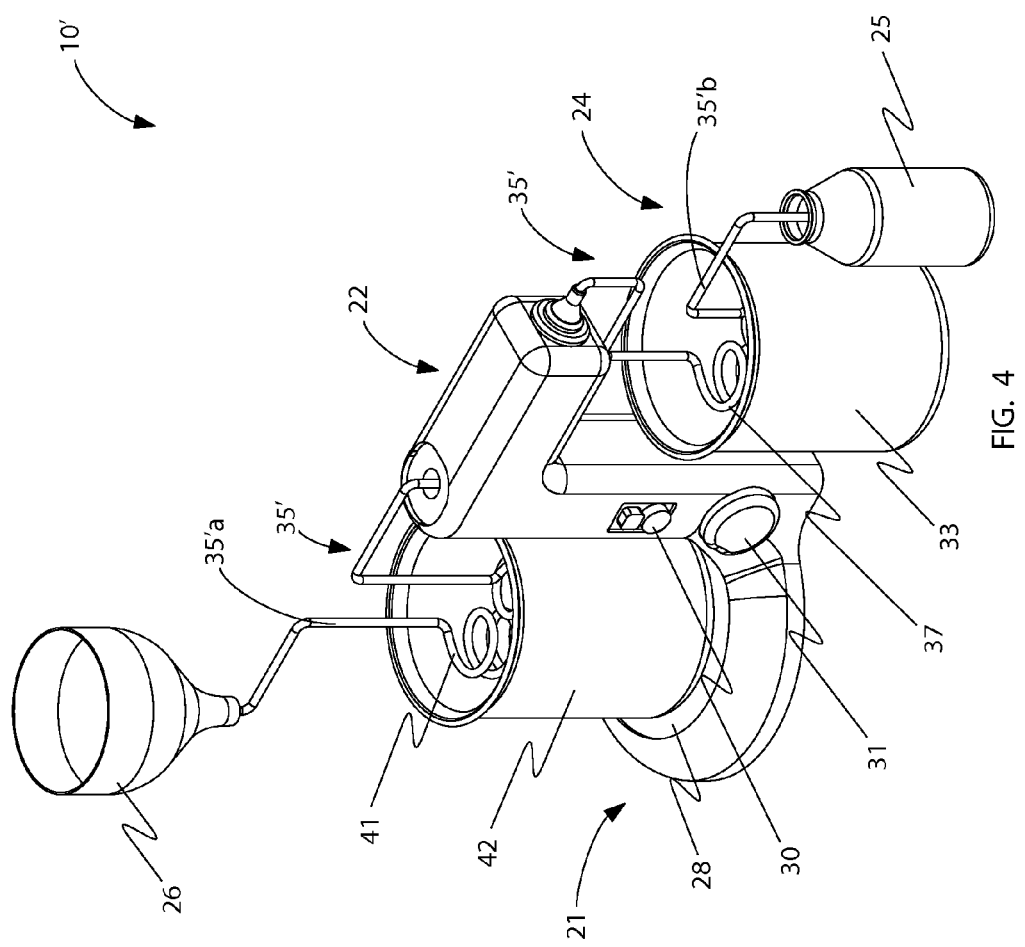
FIG. 4 is a perspective view showing another exemplary embodiment of the present invention.
Figure 5:
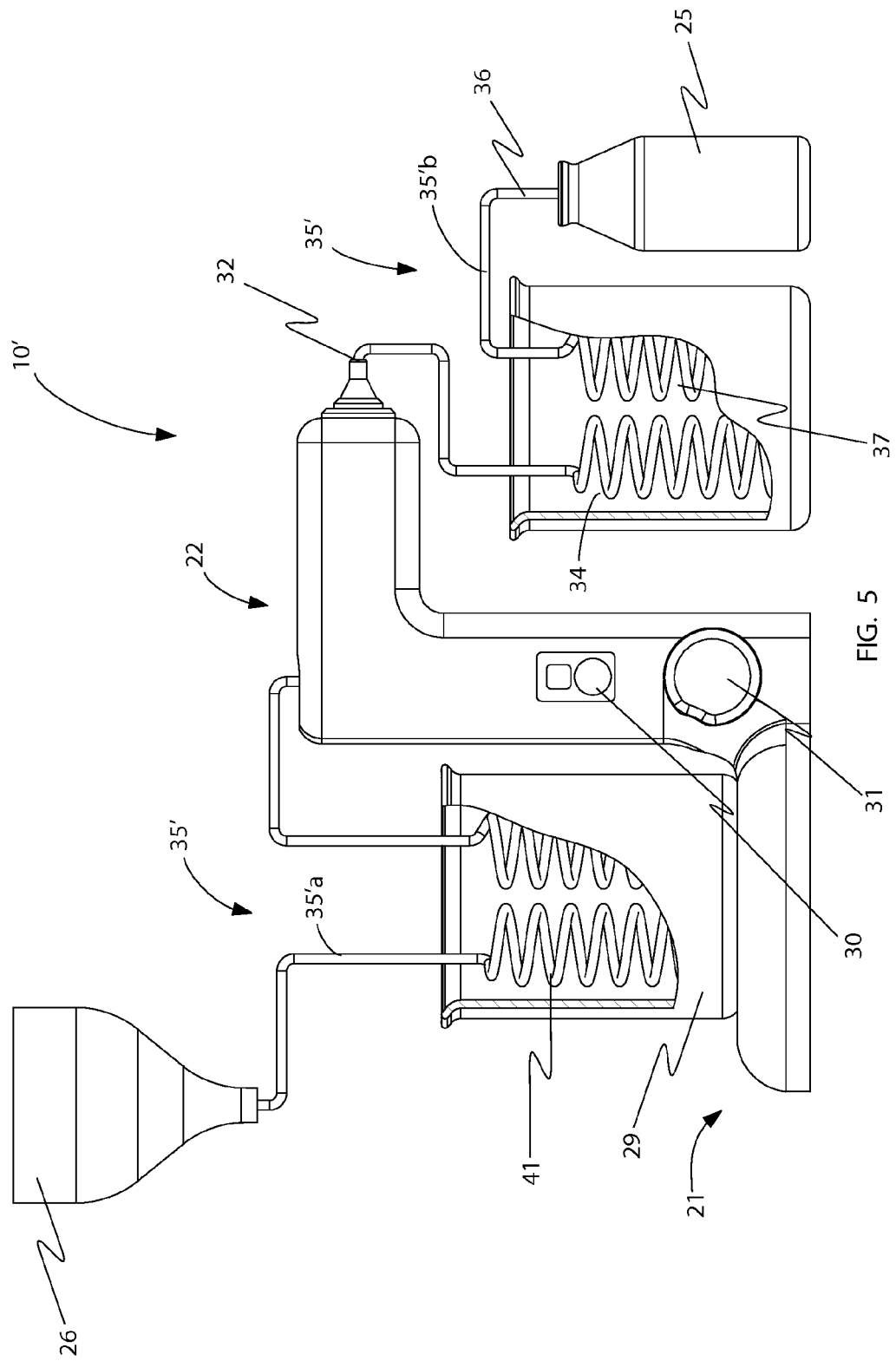
FIG. 5 is a side elevational view of the exemplary embodiment shown in FIG. 4.

Referring to FIGS. 4 and 5, in an alternative embodiment 10', tube 35' may have bifurcated first 35'*a* and second 35'*b* sections spaced apart from each other. First section 35'*a* may be in fluid communication with the heating section 21 and, second section 35'*b* may be in fluid communication with the cooling section 24. Second section 35'*b* may be located downstream of the first section 35'*a* of tube 35'. Funnel 26 may be attached to a beginning end of the first section 35'*a* of tube 35' wherein the first section 35'*a* of tube 35' is adapted to receive the unpasteurized and unhomogenized breast milk therein.

Still referring to FIGS. 4 and 5, first section 35'*a* of tube 35" preferably travels through the heating section 21 and terminates at the pump section 22. In this manner, the second section 35'*b* of tube 35' extends from a dispensing end of the pump section 22 and passes through the cooling section 24. The second section 35'*b* of tube 35' may terminate at the collection reservoir 25 wherein the second section 35'*b* of tube 35' is adapted to receive the pasteurized and unhomogenized breast milk therein. In this manner, the pasteurized and unhomogenized milk is cooled while traveling through the second section 35'*b* of the tube 35'.

As shown in the non-limiting example of FIGS. 4 and 5, first tube section 35'*a* may begin upstream of the heating section 21 whereby funnel 26 is attached to a beginning (receiving) end of tube 35'. Breast milk is poured into funnel 26 where it continuously travels within first tube section 35'*a* during the pasteurization process. In this manner, tube 35' passes through the heating section 21 and terminates at the pump section 22. The heating vessel 29 may contain a heating agent (such as hot water) that is further heated by a heating element (similar to the embodiment shown in FIGS. 1 and 2). A helical portion 41 of first tube section 35'*a* sits within heating section 21 and a terminal may be connected to the pump section 22 whereby pasteurized milk may be introduced to second tube section 35'*b*. A helical portion 37 of second tube section 35'*b* preferably extends from the pump section 22 and through the cooling section 22. The pasteurized/homogenized milk is then deposited into collection reservoir 25 disposed at a terminal end of second tube section 35'*b*.

The present disclosure may further include a method of utilizing a portable milk pasteurizing and homogenizing device 10. Such a method may include the chronological steps of: providing a portable frame 20 wherein the portable frame 20 includes a heating section 21, a pump section 22 and a controller 23 operably coupled to the heating section 21 and the pump section 22 respectively; providing and positioning a portable cooling section 24 adjacent to the portable frame 20 such that the portable cooling section 24 is in fluid communication with the pump section 22; and providing and positioning a portable collection reservoir 25 adjacent to the frame 20 such that the portable collection reservoir 25 is in fluid communication with the portable cooling section 24. In this manner, the portable cooling section 24 and the portable collection reservoir 25 are spaced from the frame 20 and independently transported while the heating section 21 and the pump section 22 remain stationary.

The method may further include the chronological steps of: obtaining and pouring unpasteurized and unhomogenized milk within the heating section 21; the heating section 21 pasteurizing the unpasteurized and unhomogenized milk; pouring the pasteurized and unhomogenized milk to the pump section 22; the pump section 22 transferring the pasteurized and unhomogenized milk to the portable cooling section 24; and the reservoir receiving pasteurized and homogenized milk from the portable cooling section 24.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A portable milk pasteurizing and homogenizing device comprising:
    a frame including
        a heating section adapted to heat unpasteurized and unhomogenized milk,
        a pump section adapted to receive pasteurized and unhomogenized milk therein, and
        a controller operably coupled to said heating section and said pump section; and
    a cooling section positioned adjacent to said frame and being in fluid communication with said pump section;
    a collection reservoir positioned adjacent to said frame and being in fluid communication with said cooling section, said reservoir adapted to receive pasteurized and homogenized milk therein;
    a tube having bifurcated first and second sections spaced apart from each other, said first section being in fluid communication with said heating section, said second section being in fluid communication with said cooling section and further located downstream of said first section of said tube; and
    a funnel attached to a beginning end of said first section of said tube, wherein said first section of said tube is adapted to receive the unpasteurized and unhomogenized breast milk therein;
    wherein said first section of said tube travels through said heating section and terminates at said pump section;
    wherein said second section of said tube extends from a dispensing end of said pump section and passes through said cooling section, said second section of said tube terminating at said collection reservoir, wherein said second section of said tube is adapted to receive the pasteurized and unhomogenized breast milk therein;
    wherein the pasteurized and unhomogenized milk is cooled while traveling through said second section of said tube.

2. The portable milk pasteurizing and homogenizing device of claim 1, further comprising: a funnel having a first passageway communicatively coupled to said pump section and adapted to transfer the pasteurized milk along said first passageway into said pump section.

3. The portable milk pasteurizing and homogenizing device of claim 1, wherein said heating section comprises:
    a heating element located at said frame; and
    a heating vessel removably positioned on said heating element, said heating vessel adapted to receive the unpasteurized and unhomogenized breast milk therein.

4. The portable milk pasteurizing and homogenizing device of claim 1, wherein said controller comprises:
    a first user interface communicatively coupled to said pump section, said first user interface being toggled between on and off modes for operating said pump section; and
    a second user interface communicatively coupled to said heating section, said second user interface controlling at least one of a temperature level and timing cycle of said heating section.

5. The portable milk pasteurizing and homogenizing device of claim 2, wherein said pump section comprises: a second passageway in fluid communication with said first passageway and oriented at a right angle thereto, said second passageway being disposed above and exterior of said cooling section.

6. The portable milk pasteurizing and homogenizing device of claim 5, wherein said cooling section comprises:
   a cooling vessel adapted to receive a cooling agent therein; and
   a tube directly connected to a dispensing end of said pump section, said tube extending downwardly from said pump section and passing through said cooling vessel wherein said tube is adapted to be exposed to the cooling agent, said tube having a discharge end situated exterior of said cooling vessel;
   wherein the pasteurized and unhomogenized milk is cooled while traveling through said tube.

7. The portable milk pasteurizing and homogenizing device of claim 6, wherein said tube has a third passageway in fluid communication with said second passageway, said third passageway passing through said cooling vessel and terminating at said collection reservoir.

8. The portable milk pasteurizing and homogenizing device of claim 7, wherein said third passageway includes a helical section completely situated within said cooling vessel.

9. A portable milk pasteurizing and homogenizing device comprising:
   a portable frame including
      a heating section adapted to heat unpasteurized and unhomogenized milk,
      a pump section adapted to receive pasteurized and unhomogenized milk therein, and
      a controller operably coupled to said heating section and said pump section; and
   a portable cooling section positioned adjacent to said frame and being in fluid communication with said pump section;
   a portable collection reservoir positioned adjacent to said frame and being in fluid communication with said cooling section, said reservoir adapted to receive pasteurized and homogenized milk therein;
   wherein said cooling section and said collection reservoir are spaced from said frame and independently transported while said heating section and said pump section remain stationary;
   a tube having bifurcated first and second sections spaced apart from each other, said first section being in fluid communication with said heating section, said second section being in fluid communication with said cooling section and further located downstream of said first section of said tube; and
   a funnel attached to a beginning end of said first section of said tube, wherein said first section of said tube is adapted to receive the unpasteurized and unhomogenized breast milk therein;
   wherein said first section of said tube travels through said heating section and terminates at said pump section;
   wherein said second section of said tube extends from a dispensing end of said pump section and passes through said cooling section, said second section of said tube terminating at said collection reservoir, wherein said second section of said tube is adapted to receive the pasteurized and unhomogenized breast milk therein;
   wherein the pasteurized and unhomogenized milk is cooled while traveling through said second section of said tube.

10. The portable milk pasteurizing and homogenizing device of claim 9, further comprising: a funnel having a first passageway communicatively coupled to said pump section and adapted to transfer the pasteurized milk along said first passageway into said pump section.

11. The portable milk pasteurizing and homogenizing device of claim 9, wherein said heating section comprises:
   a heating element located at said frame; and
   a heating vessel removably positioned on said heating element, said heating vessel adapted to receive the unpasteurized and unhomogenized breast milk therein.

12. The portable milk pasteurizing and homogenizing device of claim 9, wherein said controller comprises:
   a first user interface communicatively coupled to said pump section, said first user interface being toggled between on and off modes for operating said pump section; and
   a second user interface communicatively coupled to said heating section, said second user interface controlling at least one of a temperature level and timing cycle of said heating section.

13. The portable milk pasteurizing and homogenizing device of claim 10, wherein said pump section comprises: a second passageway in fluid communication with said first passageway and oriented at a right angle thereto, said second passageway being disposed above and exterior of said cooling section.

14. The portable milk pasteurizing and homogenizing device of claim 13, wherein said cooling section comprises:
   a cooling vessel adapted to receive a cooling agent therein; and
   a tube directly connected to a dispensing end of said pump section, said tube extending downwardly from said pump section and passing through said cooling vessel wherein said tube is adapted to be exposed to the cooling agent, said tube having a discharge end situated exterior of said cooling vessel;
   wherein the pasteurized and unhomogenized milk is cooled while traveling through said tube.

15. The portable milk pasteurizing and homogenizing device of claim 14, wherein said tube has a third passageway in fluid communication with said second passageway, said third passageway passing through said cooling vessel and terminating at said collection reservoir.

16. The portable milk pasteurizing and homogenizing device of claim 15, wherein said third passageway includes a helical section completely situated within said cooling vessel.

\* \* \* \* \*